UNITED STATES PATENT OFFICE.

ERNST PREISWERK, OF BASEL, SWITZERLAND, ASSIGNOR TO THE HOFFMANN-LA ROCHE CHEMICAL WORKS, OF NEW YORK, N. Y., A CORPORATION OF NEW YORK.

PROCESS FOR THE MANUFACTURE OF 1-ALLYL-3.7-DIMETHYLXANTHINE.

1,415,700.  Specification of Letters Patent.  Patented May 9, 1922.

No Drawing.  Application filed June 9, 1921. Serial No. 476,308.

*To all whom it may concern:*

Be it known that I, ERNST PREISWERK, a citizen of Switzerland, and a resident of Basel, Switzerland, have invented certain new and useful Improvements in a Process for the Manufacture of 1-Allyl-3.7-Dimethylxanthine, of which the following is a specification.

My invention relates to a new process for the manufacture of 1-allyl-3.7-dimethylxanthine which consists in allowing allyl bromide to act upon an alkali compound of 3.7-dimethylxanthine at temperatures below 100° C. without application of pressure; it is thereby advisable to dilute the reaction product with a suitable agent, such as water or alcohol.

Formerly 1-allyl-3.7-dimethylxanthine was prepared from 3.7-dimethylxanthine by allowing allyl iodide to act upon the raw material under application of pressure. J. von Braun and E. Müller (Berichte der Deutschen Chemischen Gesellschaft, vol. 50, 1917, page 292) obtain 1-allyl-3.7-dimethylxanthine by heating 3.7-dimethylxanthine with allyl iodide and alkali to 100° C. under application of pressure, a method corresponding with the process already known for the manufacture of caffeine according to Emil Fischer (Berichte der Deutschen Chemischen Gesellschaft, vol. 30, 1897, page 1845).

Reactions which have to be carried out under application of pressure have the great disadvantage of requiring complicated and expensive apparatuses.

The possibility of carrying out the reaction with allyl bromide at a low temperature without pressure, at the same time obtaining a good yield, whereas with allyl iodide, which as a rule is more easily reactive, pressure was indispensable, was unexpected. The process yields in a simple and easy manner the 1-allyl-3.7-dimethylxanthine which is destined for use in therapy.

*Example 1.*

180 parts of 3.7-dimethylxanthine are mixed with 1440 parts of absolute alcohol. While stirring incessantly 130 parts of a 48 per cent aqueous solution of caustic potash are added. The mixture is then boiled under a reflux condenser and while still stirring 133 parts of allyl bromide are added drop by drop within about 2 to 3 hours after which the product is kept boiling for 5 to 6 hours longer. After this time the reaction product is separated from the alcohol. If necessary the solution is evaporated on the steam-bath whereupon the principal quantity of 1-allyl-3.7-dimethylxanthine is obtained by crystallization. In order to dissolve any remaining parts of 3.7-dimethylxanthine a solution of sodium hydroxide is added. From the filtrate of the crystallized product the rest of the 1-allyl-3.7-dimethylxanthine may be obtained by shaking with chloroform after having removed the unchanged 3.7-dimethylxanthine. By a single crystallization from water the compound is rendered absolutely pure. The yield is almost theoretic.

*Example 2.*

180 parts of 3.7-dimethylxanthine are mixed with 1450 parts of absolute alcohol and while stirring 115 parts of a 48 per cent aqueous solution of caustic potash are added. After having heated the reaction product until boiling sets in, 115 parts of allyl bromide are dropped in within the course of two hours, the boiling being then continued for two hours longer. Thereupon 25 parts of a 48 per cent solution of caustic potash and slowly as before 25 parts of allyl bromide are added. Now the mixture is boiled during 4 hours under a reflux condenser. The alcohol is then distilled off and the residue treated as indicated in Example 1. The product thus obtained is crystallized from 800 parts of water; in this manner and without making use of the two remaining lyes a yield of 178 parts of absolutely pure 1-allyl-3.7-dimethylxanthine are obtained.

*Example 3.*

Over 180 parts of 3.7-dimethylxanthine are poured 1000 parts of warm water and while stirring a 30 per cent solution of sodium hydroxide is added until all 3.7-dimethylxanthine is dissolved and the reaction of the solution upon trinitrobenzol paper is slightly orange. The solution is then heated while stirring under a reflux condenser to an inner temperature of 70–80° C. and 130 parts of allyl bromide are slowly dropped in without letting the boiling become too violent. The mixture is then boiled for another hour. By the addition of a solution of sodium hydroxide any parts of unchanged 3.7-dimethylxanthine are dissolved and when the solution has cooled the 1-allyl-3.7-dimethylxanthine is obtained in crystallized form free of 3.7-dimethylxanthine.

*Example 4.*

To a solution of 180 parts of 3.7-dimethylxanthine in 1900 parts of a 3.3 per cent solution of caustic potash are added 132 parts of allyl bromide and the mixture is stirred during 36 hours at 30 to 35° C.; any loss of allyl bromide through evaporation must be carefully avoided. After this time a considerable quantity of 1-allyl-3.7-dimethylxanthine mixed with some free 3.7-dimethylxanthine, which is dissolved by the addition of a solution of caustic potash, is precipitated. The 1-allyl-3.7-dimethylxanthine is crystallized from water; the melting point of the crystals then corresponds with that of the pure product.

I claim:

1. The process for the manufacture of 1-allyl-3.7-dimethylxanthine which consists in allowing allyl bromide to act upon an alkali compound of 3.7-dimethylxanthine at temperatures below 100° C. without application of pressure.

2. The process for the manufacture of 1-allyl-3.7-dimethylxanthine which consists in allowing allyl bromide to act upon an alkali compound of 3.7-dimethylxanthine at temperatures below 100° C. without application of pressure in the presence of a diluent.

In witness whereof I have hereunto set my hand.

ERNST PREISWERK.

Witnesses:
ALBERT ALFRED HOFFMANN,
HENRY KUBLI.